US006912398B1

(12) United States Patent
Domnitz (10) Patent No.: US 6,912,398 B1
(45) Date of Patent: Jun. 28, 2005

(54) APPARATUS AND METHOD FOR DELIVERING INFORMATION TO AN INDIVIDUAL BASED ON LOCATION AND/OR TIME

(76) Inventor: David Domnitz, 5700 NW. 54th Way, Tamarrac, FL (US) 33319

( * ) Notice: Subject to any disclaimer, the term of this patent is extended or adjusted under 35 U.S.C. 154(b) by 0 days.

(21) Appl. No.: 09/546,851

(22) Filed: Apr. 10, 2000

(51) Int. Cl.$^7$ .............................................. G06F 17/60
(52) U.S. Cl. ................. 455/461; 455/456.1; 455/456.3; 455/457; 705/14; 705/26
(58) Field of Search ................................ 455/461, 456, 455/457, 456.3, 314; 705/26, 14; 701/209, 211

(56) References Cited

U.S. PATENT DOCUMENTS

| | | | |
|---|---|---|---|
| 5,218,367 A | 6/1993 | Sheffer et al. | 342/457 |
| 5,819,039 A | 10/1998 | Morgaine | 395/200.47 |
| 5,887,269 A | 3/1999 | Brunts et al. | 701/208 |
| 5,938,721 A | 8/1999 | Dussell et al. | 701/211 |
| 5,959,577 A | 9/1999 | Fan et al. | 342/357.13 |
| 5,964,821 A | 10/1999 | Brunts et al. | 701/201 |
| 5,999,912 A | 12/1999 | Wodarz et al. | 705/14 |
| 6,006,218 A | 12/1999 | Breese et al. | 707/3 |
| 6,026,369 A | 2/2000 | Capek | 705/14 |

FOREIGN PATENT DOCUMENTS

EP   WO 99/51038   10/1999

Primary Examiner—Nick Corsaro
Assistant Examiner—Alan Gantt
(74) Attorney, Agent, or Firm—John C. Smith (57) ABSTRACT

A time/location information delivery system that provides focused advertising and/or other information to individuals based on the time and their location. A wireless identification device is carried by an individual and can be read from or written to when the individual passes by interrogators in a specific geographic location. The detectors read ID information embedded in the wireless identification device. A computer uses the ID and location information to select, from a list of information providers, those information providers which provide information content identifiable or correlated to a location and/or time, and is of interest to the individual. The information content can be forwarded to the individual by a variety of information channels. One channel uses conventional Internet email to deliver advertisements and other information to the individual's Internet mailbox. The email can be delivered to a conventional PC, a portable computer, a PDA, an intelligent telephone, pager or other suitable device. For ease of discussion, a pager and a PDA will be referred to collectively as a PDA. The wireless identification device can be an RFID tag embedded in a card, or even a wireless telephone. The RFID tag is read or written to by fixed interrogators and the location of the wireless telephone is detected by triangulating information from cell towers or by embedding the GPS receiver in the wireless telephone thereby providing the location information directly from the telephone. Of course, other nearly identical location determination means, such as quadrangulation could also be used. The location determination can be performed through similar means with other devices such as PDAs, laptops, pagers, etc.

95 Claims, 3 Drawing Sheets

APPARATUS AND METHOD FOR DELIVERING INFORMATION TO AN INDIVIDUAL BASED ON LOCATION AND/OR TIME

BACKGROUND OF THE INVENTION

1. Technical Field

The present invention relates to information delivery systems. In particular, it relates to the delivery of information to an individual based on the individual's movements, and/or the individual's interests, and/or the time the individual is at a particular location, and/or the unique aspects of a particular location.

2. Background Art

While advertising has a substantial positive effect on any business, the cost of advertising can be a significant portion of the operating budget of any business. As a result, it is very important for any business operation to maximize the effectiveness of its advertisements. A primary disadvantage associated with conventional advertising and/or the delivery of noncommercial information is that it is unfocused such that it reaches a broad general audience rather than the smaller defined audience desired by the advertiser or other information provider.

Traditional advertising on the Internet uses hyperlinks in the form of banner ads. Companies using this type advertising have found that it has limited effectiveness because many individuals who visit Web sites ignore these banners, while the advertising companies pay for them regardless of whether the visitor clicks on their ads or not. It would be desirable to have a method of focusing advertisements on the most receptive individuals.

Another method of delivering advertisements for coupons to an individual using the Internet is through email. This is accomplished usually after someone visits a site, fills out an online form, and submits the form to be processed usually through a form handler. While this method may be effective for existing customers who may have loyalty to the advertising company, it can be ineffective for new customers because they may not take the time to enter any information. In addition, a substantial number of Internet users routinely discard advertising email, as a form of junk mail, without ever reading it. As a result, even if an advertiser identifies the potential customer and sends email, a substantial amount of that email will never be read. It would be desirable to have a system in which the likelihood of the potential customer reading the advertising communication would be relatively high.

Another problem associated with conventional Internet marketing is that due to the proliferation of Web sites, new companies engaging in e-commerce often find that they can only obtain Web addresses that are not the company's name, are not appropriate for the company, or do not seem to be the related to the goods or services sold by the company. The disadvantage of a poor Web address is that it increases the likelihood that the company will lose sales at their site since a potential visitor wouldn't think of such an unlikely address for the company, and often won't use a search engine to find the correct address. Ultimately, anything that makes it less convenient or harder for someone to link to a Web site will cost that company business. This inability to have a Web address that adequately reflects the company and/or its name is due to several factors and is one of many problems solved by the invention. Some of these factors are: 1) a limited number of characters are permitted for the Web address; 2) the high level of interest in the Internet has caused many entities to acquire rights in Web addresses which would better suit other companies and which are not used by the company that acquired them; 3) a company can acquire otherwise identical Web addresses which end in .com or .net and use both of those addresses to hyperlink to a single Web site, which further limits the number of available names; 4) there are many similar and confusing Web site addresses, for example Web addresses which are identical except for special characters such as dashes or underscores, which makes it harder to remember the Web site address; and 5) simply not remembering the Web site address. It would be desirable to have a method of using the Internet which is independent of the individual knowing the actual Internet Web site address.

Unfocused information is that information which is broadcasted to the general public in an indiscriminate manner. For example, a conventional television, radio, billboard, or print advertisement would be received by many individuals, most of whom would have no interest in the particular product or service in the advertisement. As a result, a significant portion of the cost associated with presenting a particular conventional advertisement is wasted since the advertisement is presented to the wrong individuals. It would be desirable to have an effective method of focusing advertising and distributing information to a well-defined set of individuals who represent the target group desired by the advertiser or information distributor.

Attempts to improve the effectiveness of advertising have involved the acquisition of information directly from individuals which describes their interests and resources. This can be done in one of several ways. For example, when an individual fills out a warranty card after a purchase, the warranty card typically contains numerous questions about the purchaser. These questions may inquire as to an individual's age, income, and interests. This demographic information may then be used to identify the most likely purchaser of a particular product or service. Once the group containing the most likely purchasers is identified, direct advertising can be presented to those purchasers. Hopefully this process will result in a greater percentage of purchasers for a given advertisement, which will in turn result in more effective use of the funds allocated to a business's advertising budget due to the resulting increase in sales.

The disadvantage associated with this type of marketing is that many types of economic activity are relevant to a particular individual depending on where that individual may be at a given time. For example, if an individual is an avid golfer, the computer may have this fact in its database. This would allow golf related advertisements from local merchants to be directed to the individual at the individual's residence etc. However, if the individual was traveling, local merchants in the area the individual was visiting would not be aware of the individual's presence and would have no reason to attempt to market their products to the visiting individual. It would be desirable for local merchants to have a method of contacting individuals visiting their locale at the time the individual was visiting such that the individual could take advantage of products and services provided by the local merchants.

With the advent of the Internet and e-commerce, the advantages and disadvantages of advertising have both increased. On the one hand, a small private or commercial entity is now able to reach a global market which was heretofore unavailable to any but the largest economic concerns. On the other hand, there is no value for a small entity to have access to a global market when that entity may in fact only be able to provide particular goods or services in a limited geographic area. For example, a restaurant's clientele must be in the local area to take advantage of the restaurant's services. Further, if an individual is visiting the area of the local merchant, the individual may not have any knowledge of the local merchants' products and services. Due to this, not only do many local merchants not have an extensive out of area business due to e-commerce, they are also unable to take advantage of visitors to the area. It would be desirable to have a method of using the Internet to detect the presence of a visitor to a local area, and once the individual is detected, to allow the local merchants to advertise directly to the individual when the individual is in that area.

While addressing the basic desirability of advertising, the prior art has failed to provide a focused method of distributing information, either commercial advertising or other information, which is focused on a select target group of individuals, and can provide information to those individuals which is dependent on the time and/or the location that the individuals are in a given area

SUMMARY OF THE INVENTION

The present invention solves the foregoing problems by providing a system that provides focused advertising and/or other information to individuals based on the time and/or their location. The individuals carry a wireless identification device which can be identified as an individual passes through a specific geographic location. The identification information is then sent to a computer, such as a server on the Internet, which uses the identification information to access the individual's records. In addition, the location information is also uploaded to the server. A computer uses the ID and location information to select, from a list of information providers, those information providers which provide information content identifiable or correlated to a location and/or time, and is of interest to the individual.

The information can be forwarded to the individual by a variety of information channels. One channel uses conventional Internet email to deliver advertisements and other information to the individual's Internet mailbox. The email can be delivered to a conventional PC, a portable computer, a PDA (a personal digital assistant, well-known in the art), an intelligent wireless telephone or other suitable device.

The identification information can be stored in a card with an embedded RFID tag and its location determined by fixed interrogators. Alternatively, intelligent devices such as PDAs and wireless telephones can have embedded within them a GPS receiver which can provide precise position information and be transmitted directly to fixed interrogators or wireless telephone towers which will then relay that information to the computer. Another alternative embodiment uses multiple wireless telephone towers to detect wireless telephones that are not local to the area and to determine the position of the wireless telephone through triangulation techniques.

DESCRIPTION OF THE PREFERRED EMBODIMENT

Prior to the discussion of the figures, a general overview of the features and advantages of the invention will be provided. The invention is directed to a method of providing focused information to individuals based on the time and/or the location of the individual in relation to a particular source of information or information provider. An information provider can be a merchant or advertiser, a public entity distributing information, or any other entity seeking to distribute information based on time and the location of an individual. This focused information can be very useful when used by local merchants attempting to reach visitors to the merchants geographical area, but it can be equally useful when marketing to local residents.

In general, this system can use personal preferences as a way to filter content from providers, but ordinarily position and/or time information determines which, not how much, data will be loaded or forwarded for an individual to see or use. In the event an individual desires to receive only certain types of information, then the individual can, via the system, update the filtering criteria. The system would filter out any information which the individual has indicated to be undesirable. This protects the user from receiving large quantities of unwanted information from a variety of advertisers or other sources. One way that the filtering preferences can be selected is via a form page in a Web site.

In addition to filtering under control of the individual, the system can also dynamically filter information before it is sent to the individual. This would be done to eliminate any redundant messages or hyperlinks that would otherwise be presented to the individual.

The system uses the Internet to deliver Web pages or other content through non-traditional push means. The information is directed to particular individuals when their presence is detected in a particular location. The information is distributed using conventional Internet email, or it can be distributed via an individual account designed to store accumulated content for display to the account member through wireless devices such as PDAs or intelligent wireless telephones interfacing with the Internet.

The system determines the presence of an individual through the use of an identification device, such as an RFID tag, intelligent wireless telephone, or other device such as a PDA, and based on the individual's identity and location and/or time they are at a location, the system selects information related to the location or time and pushes the information down through the available information channels to that individual. Once the system identifies the individual, it delivers information content, in whole or in part, via the Internet and through appropriate wired or wireless devices.

An example of how the invention is used is as follows: if an individual is carrying an identification device, such as an RFID tag in the individual's wallet, and the individual is passing by a particular store which has an interrogator, the interrogator in the store will read the identification information in the RFID tag and forward that information to a computer along with the location of the interrogator. The computer can then access any records related to the individual with the information from the RFID tag. The computer's records may indicate that the individual has preferences for a particular product or service. If the product or services are on sale, the computer can then notify the individual to allow the individual to take advantage of the sale or availability of the product. While older Internet communication methods, such as email, or pushing an icon to the customers desktop through conventional push technology can be used, the system can also notify the individual via alternative methods. For example, if the individual has a PDA, or an intelligent wireless telephone, the computer can immediately notify the individual by sending email or any other suitable message to the PDA or intelligent wireless telephone. Likewise, the information can also be made available to the individual at a specific Internet web site, say for example, through a user account. Alternatively, displays within the store can be synchronized with the individual such that as the individual passes by a specific location within the store, customized advertisements or information based on past user purchases or user preferences can be automatically downloaded to the monitors as the user passes by fixed interrogators within the store.

Interrogators can be self contained devices. However, their functions can also be implemented by computers having the necessary transmitter, receiver, and antenna.

A preferred embodiment of particular interest is one in which an RFID tag used as the identification device is embedded in a conventional credit card. This provides convenience to the individual because the individual does not have to carry anything additional beyond what the individual already carries. In addition, since credit cards are almost universally used, the placement of the identification device inside a credit card would achieve rapid penetration of the entire marketplace.

Figure 1:
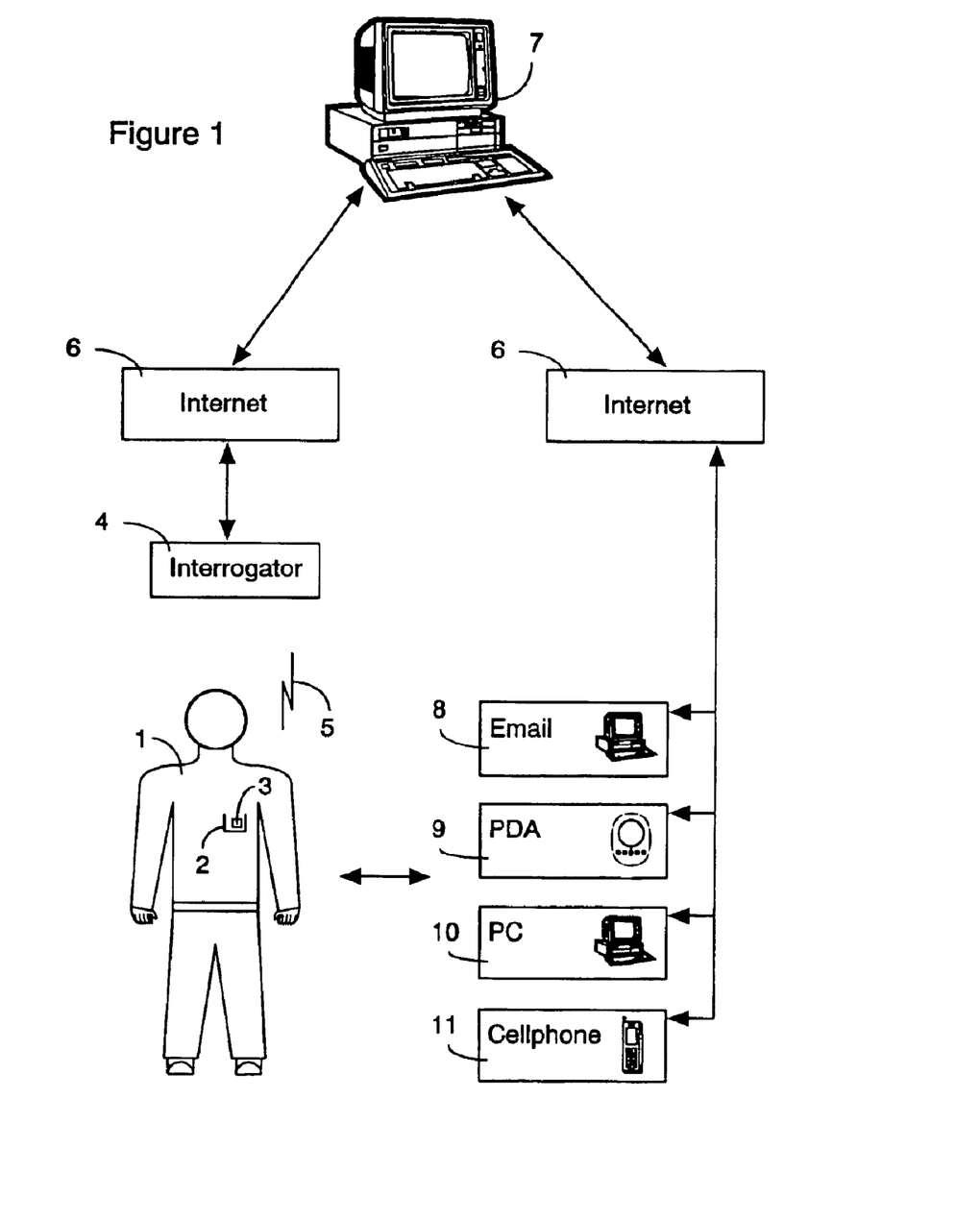
FIG. 1 is a diagram which illustrates data flow between an individual and an advertiser or content provider system.

Referring to FIG. 1, this figure illustrates the flow of information in a preferred embodiment of the invention. As shown in this figure, an individual 1 will be carrying identification device 3. The identification device 3 should preferably be small enough to be carried conveniently in the individual's 1 wallet. For ease of illustration, the identification device 3 is shown in the individual's 1 pocket 2. In the preferred embodiment, the identification device 3 would be an RFID tag with a unique ID number associated with that individual 1. RFID tags and interrogator techniques are well-known in the art. As a matter of convenience, the RFID tag may be encased in a plastic card similar to a credit card for the purpose of allowing it to be conveniently stored in the individual's 1 wallet along with the individual's 1 credit cards.

Those skilled in the art will realize that an extremely effective way of using the identification device 3 is not to put it in a stand-alone container, but rather to embed it inside an actual credit card. This eliminates the need for the individual to carry anything extra, it ensures that the individual will be careful not to lose it, and it ensures that wide market penetration will be achieved by the system.

As the individual 1 travels from one location to another, the individual 1 may pass by an interrogator 4 (for the purpose of this discussion, an interrogator may also be referred to as an information retrieval or writing or loading device). In the preferred embodiment, a series of interrogators 4 would be located in various locations to allow an individual 1 to be monitored over a wide geographic area. It may also be possible, particularly to reduce costs, to use a switching scheme where only one interrogator's 4 transmission is relayed to different antennas at a physical or "brick and mortar" store. The switching can be prompted by a passive IR interrogator or can just be sequentially fired. This reduces the number of interrogators 4 which are needed. As the individual 1 passes the interrogator's 4 antenna, the interrogator 4 would awaken or energize the identification device 3 and the identification device 3 would respond to the interrogator 4 by modulating unique identification information to the interrogator 4 via returned RF. Interrogator 4 and RFID technology are well-known in the art. In addition to the RFID tags used by the interrogators 4, other technologies, such as phase shifting detection (Doppler) and signal strength (amplitude) detection can also be used to determine location.

Those skilled in the art will recognize that while a commonly available RFID system is used in this embodiment, any suitable wireless technology can be used, such as near field (magnetic or "H" field) tags similar to those used as antitheft devices in stores, infrared devices, smart cards, bar codes, magnetic strips, ultrasonic transducers, etc. In addition, hybrid technologies can also be used. For example, GPS chip sets can be used in combination with an RFID tag. An on-board clock and timing circuit can be used to record locale at regular time intervals. The RFID tag can send this information when energized by an interrogator 4. These hybrid technologies allow merchants or information gatherers to monitor movement of an individual through a given geographic area, for example, a store. This provides the observer with information which may be useful in monitoring traffic, placing advertising, etc.

Of course, some of these devices will require conscious action on the part of the individual 1 to activate. In the preferred embodiment, a read-only RFID transponder is embedded in the card. However, it is also possible to use a read/write RFID transponder to allow the information in the identification device 3 to be altered. Likewise, while only one RFID transponder is needed to implement the system, multiple RFID transponders can be placed in the identification device 3 to allow the identification device 3 to be used in other countries such that the same identification device 3 can comply with government regulations in more than one country. In this case, each RFID transponder would operate in a different frequency or in a different frequency band. Likewise, multiple transponders may be used with different frequencies to provide redundancy which will avoid lost detections due to missed transmissions, and also provide improved performance by allowing the interrogator 4 to select the strongest incoming signal.

The interrogator 4 reads the ID information in the identification device 3 and transmits the individual's 1 ID information, in combination with location information to an advertiser system 7 via the Internet 6. The advertiser system 7, as discussed herein, is the system which gathers information from advertisers and other information providers, and which controls the downloading of that information to the individual. The advertising system 7 also collects preference selection information from the individual 1 and uses it to filter the information which is downloaded to the individual 1. The connections between the interrogator 4, the Internet 6, and the advertiser system 7 can be any convenient technology, such as land line modem, cellular modem, hardwired connection (cable network, DSL, etc.). Once the advertiser system 7 receives the ID information from the individual 1, the advertiser system 7 then uses the ID information to access the individual's 1 records in the advertiser system 7. Based on the individual's 1 records, the advertiser system 7 knows that the individual 1 is more likely to be receptive to an advertisement or communication from one or more content providers related to the location and/or time that individual was at the location. The advertising system 7 will then select appropriate information and transmit that information to the individual 1 via predetermined information channels.

Those skilled in the art will recognize that the interrogator 4 may be a dedicated device which executes a single function. Likewise, it may also be implemented by being attached to a conventional PC.

For example, the advertising system 7 may forward email 8 to the individual 1 via the Internet. This is a conventional method of sending email 8 which does have a drawback in that it may not be received until the individual 1 checks incoming email 8. The advertising system 7 may also decide to send communications to the individual 1 via more recently developed devices such as a PDA 9. The advantage of the PDA 9 is that it can be carried by the individual 1, which makes the incoming communication immediately available. If the PDA 9 is equipped with a cellular modem, the PDA 9 can receive a message or be used to access email immediately. A PC 10, either desktop or portable, can also be used to receive messages from the advertising system 7. When a PC 10 is used, alternatives to email can also be used. For example, the individual's 1 account can be accessed or a button in the browser bar can be "clicked" to view hyperlinks and advertisements. Also, the final delivery stage of content delivery can be through "traditional" push means. Alternatively, some data can be forwarded to the individual 1 via audio technology. In that situation, the individual 1 would specify that the text information is to be converted to audio via a text to speech program that would play the information to the individual 1 via an audio output device, such as the intelligent wireless telephone 11.

In another alternative preferred embodiment, intelligent wireless telephones 11 can be used to receive the information. Intelligent wireless telephones 11 have been developed with a display screen suitable for displaying messages. These devices have built-in intelligence features that exceed the basic telephone technology. For example, they can have small processors and Web browsers which will allow them to surf the Web, to receive e-mail, etc. These devices are also commonly referred to as being Web enabled. One advantage of using an intelligent wireless telephone 11 is that the advertising system 7 can use the Internet to contact the intelligent wireless telephone 11 or directly dial the intelligent wireless telephone 11 without using the Internet. The individual 1 would be immediately notified of the incoming message when the intelligent wireless telephone 11 rings.

In addition to the conventional methods of receiving data, an identification device 3 reader can also be attached to the individual's 1 computer to read the information provided by the RFID device in the identification device 3. In this configuration, when the individual 1 activates the individual's 1 computer, the identification device 3 is waived in front of the reader, the reader automatically notifies the advertising system 7 via the Internet, and the information is downloaded to the individual 1 or interfacing device (i.e.: PC, laptop, PDA, etc.).

Another advantage of the invention is that it allows an individual who does not own a PC to be able to take advantage of the information provided by the invention As discussed above, one alternative embodiment provides the ability to attach an interrogator 4 to a PC which may be owned by a merchant or some other entity, such as a library. If the individual 1 uses the merchant's or library's PC, the individual 1 would wave the identification device 3 in front of the interrogator 4. This would notify the advertising system 7 of the presence of the individual 1 at that PC, and the advertising system 7 would then proceed with downloading information to the individual 1.

In the preferred embodiment, an individual 1 would provide demographic and reference information which would be stored in the individual's record in the advertising system 7 computer. This information would be related to the identification information on the identification device 3 so that the advertising system would be able to evaluate potential information which is most appropriate to the particular individual 1.

Figure 2:
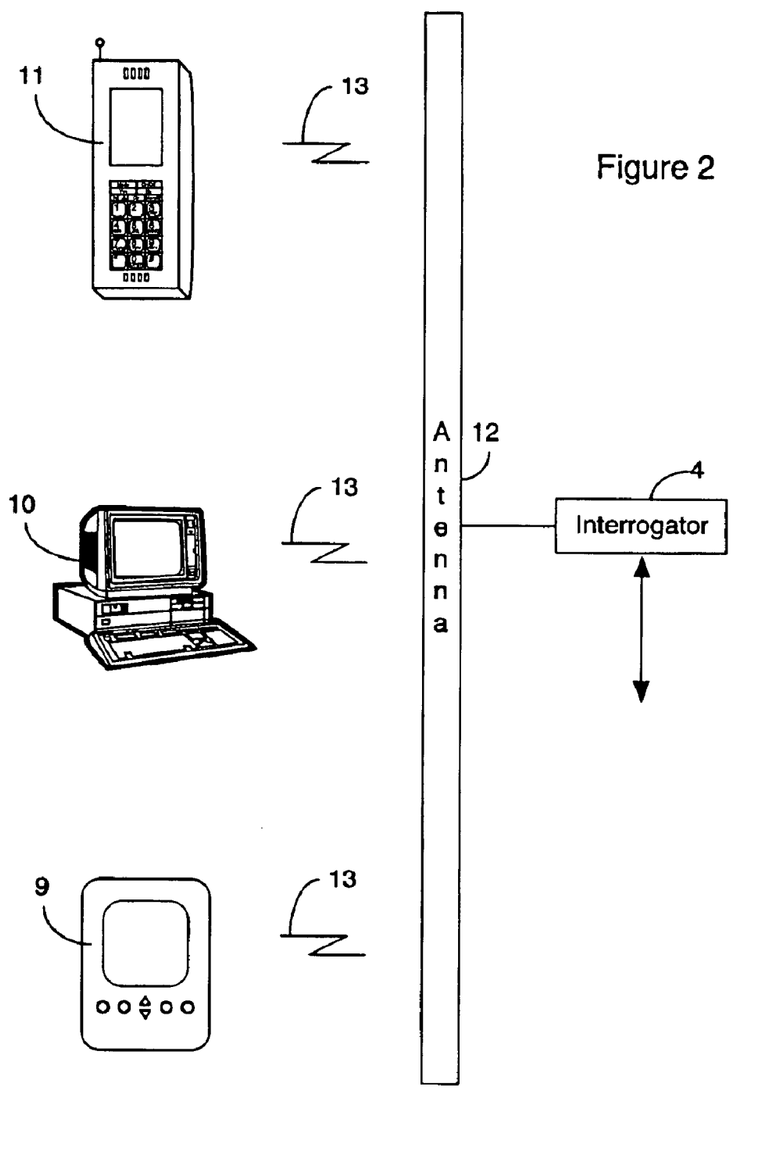
FIG. 2 is a diagram that illustrates an alternative embodiment of the invention in which the identification device is shown embedded in several different types of I/O devices.

FIG. 2 illustrates an alternative preferred embodiment in which the identification information can be stored in alternative devices rather than the identification device 3 discussed above. In particular, in the event that the PDA 9, the PC 10, or an intelligent wireless telephone 11 is used, the identification device 3 can be integrated with either the PDA 9, the PC 10, or the intelligent wireless telephone 11. This would eliminate the need for the individual 1 to carry the identification device 3.

The only requirement for output devices used by the individual 1 to receive information is that they must have Internet access (with the exception of the intelligent wireless telephone 11).

The ability of the invention to determine where an individual 1 is at a given time allows a merchant or other information provider to focus its advertising on individuals 1 who have a probability of interest in a particular advertisement or information content. This is possible because the individual's 1 record on the advertising system 7 will contain demographic information that indicates to merchants whether there is a probability of interest. Likewise, the time the individual 1 is detected can be an important factor in advertising. For example, an advertiser who manages a restaurant may have a strong interest in immediately notifying nearby individuals 1 during the lunch or dinner hours. Alternatively, advertisements for restaurants would not be sent to the individual 1 after the restaurant is closed. Yet another example would be a business which advertises using billboards, bus stops, magazines stands, etc. These advertisements can be correlated to a specific location in between two or more specific dates. When someone is at this location at a particular time, the system can determine which advertisements were seen by that individual.

Shown in this figure is an interrogator 4 attached to an antenna 12. For ease of illustration, the antenna 12 is shown as a separate device, but it may just as easily be an integrated component of the interrogator 4. When the advertising system 7 has selected a the appropriate advertisements and/or information for the individual 1, it then transmits that information to the interrogator 4 via the Internet 6. The information is then transmitted via a hardwired link to a display or audible device (using speech software) or via wireless link to any of the interfacing devices such as the PDA 9, computer 10, or the intelligent wireless telephone 11.

Those skilled in the art will recognize that while the interrogator 4 can be a read-only device that only forwards identifying information to the advertising computer 7, the interrogator 4 can also be designed as shown in this figure to have read/write capability. Read/write capability provides increased functionality since it allows immediate transfer of data via the same data path used to collect the identifying information.

Figure 3:
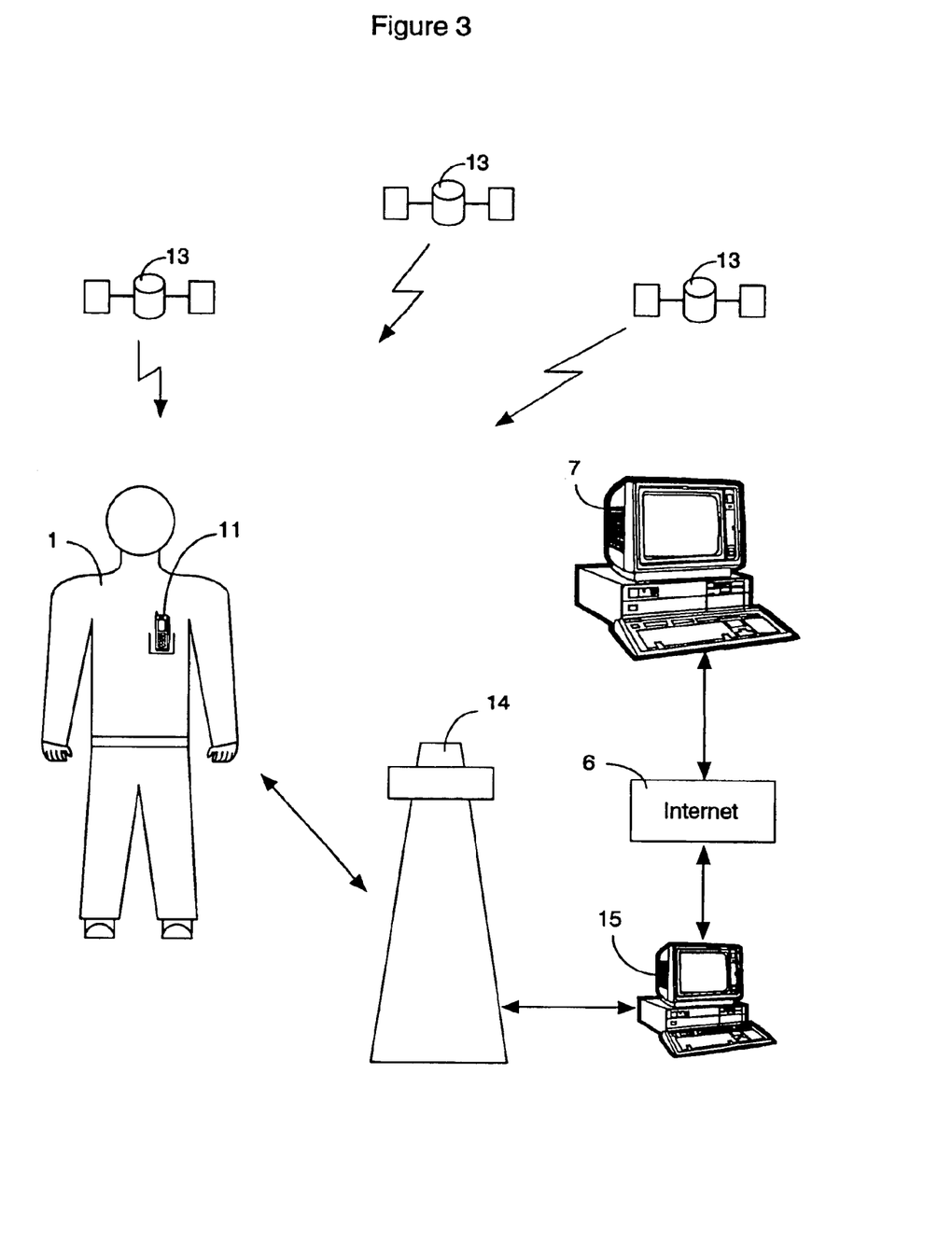
FIG. 3 is a diagram that illustrates another alternative embodiment of the invention in which the identification device determines its own location from GPS satellite information and transfers that information to the advertising computer via the cellular telephone system and the Internet.

In FIG. 3, another alternative preferred embodiment is illustrated. This embodiment eliminates the need for an interrogator 4. It uses pre-existing GPS satellite position information and existing cellular phone systems. In addition, for ease of illustration, an intelligent wireless telephone 11 is shown in this figure. While one particular technology is used for illustrative purposes, those skilled in the art will recognize that any suitable wireless technology can be used. In addition, those skilled in the art will realize that a device such as a PDA 9 equipped with a wireless modem can also function similar to the intelligent wireless telephone 11.

Those skilled in the art will recognize that GPS is only one of a number of commercially available positioning systems. For example, Omega, Decca, Tacan, JTIDS, Loran, Relnav and PLRS are known navigation systems. However, GPS is preferred because of its accuracy, global availability, and low-cost.

In the shown figure, the individual 1 carries an intelligent wireless telephone 11. The intelligent wireless telephone 11 has an integrated GPS receiver (GPS receivers are well-known in the art) which receives GPS satellite position information from GPS satellites 13. The intelligent wireless telephone 11 determines its exact location based on the GPS data. The GPS data enables the computation of position, including longitude, latitude, and altitude data which identifies a precise geographic location. This data would preferably be passed to the advertising system 7. As the individual 1 moves through a cellular telephone node area, the intelligent wireless telephone 11 communicates with the cellular telephone tower 14 on a periodic basis. At this time, the intelligent wireless telephone 11 transmits its GPS location data to the cellular telephone tower 14. The intelligent wireless telephone 11 may also transmit its identification information to the cellular telephone tower 14 at this time. However, this identification information may also be omitted since the telephone number is unique to the individual 1, and therefore the advertising system 7 can determine who the individual 1 is without receiving identification information other than the telephone number.

The information received from the individual 1 at the cellular telephone tower 14 is communicated to a data processing station 15 connected to the cellular telephone tower 14. In turn the data processing station 15 transmits the individual's 1 identifying information and location information to the advertising system 7 via the Internet 6. Once the individual 1 is detected, the advertising system 7 can then directly download the appropriate data corresponding to the advertiser in that location to the intelligent wireless telephone 11 via the cellular telephone network using the data processing station 15 and the cellular telephone tower 14.

An alternative preferred embodiment uses a GPS "slave" which is attached to an on-board "master" that commands the GPS slave to output location information at preset times. Using this information, the intelligent wireless telephone 11 transmits in batch quantities, all advertiser locations within an area close to the GPS computed location when requested by the master. The intelligent wireless telephone 11 has incorporated within it a scaled-down version of an Internet 6 Web browser. Information from advertisers and/or information providers in the requested location is downloaded to the intelligent wireless telephone 11 via the Internet 6 and cellular network.

As the individual 1 eventually travels by each location, the individual's 1 movement can be logged. This logged information can be used to measure the effectiveness of the advertising and to determine if the individual 1 has actually visited any of the advertiser sites. The advertiser sites may be any site which provides information to the individual 1, which may include not only stores that provide products or services, but also other physical locations, such as billboards which only provide information or advertisements.

The foregoing embodiments have been discussed in terms of conventional advertiser sites with fixed locations. However, the invention is not limited to this scenario. For example, "mobile stores" or "advertisements" can have affixed a GPS/phone to report its location at any instant in time. This enables the "mobile store" or "ad" location information to be compared to an individual's 1 intelligent wireless telephone 11 location information. When a match occurs, the system functions the same as if the mobile store or ad were at fixed locations and only the individual 1 was mobile. This is a similar situation to that in which a merchant "walks" an area. When a merchant walks an area, the merchant defines the geographic area to which the merchant's information is to be distributed. Mobile stores or advertisements function in the same manner. As the mobile store or advertisement moves through an area, it dynamically updates the area to which its information applies, and any individual 1 who happens to be close enough to be identified will receive information related to the mobile store or advertisement.

Another advantage of the invention is that it can be used for social as well as commercial activity. For example, a "Buddy" system can be implemented whereby individuals can be alerted when friends are in the area, such as when two or more individuals are detected in a shopping mall. The system can notify each of the individuals so that they can have the opportunity to meet. This feature can be implemented as part of the individual's preference which the individual sets into the system. Preferably, this feature can be dynamically modified so that an individual can turn the feature on or off at will by updating preferences.

Another preferred embodiment allows the advertising system to synchronize with online radio and television broadcasts. A number of Internet Web sites currently provide radio and programming broadcast from various locations. If an individual is online and connected to one of those Web sites, the advertisements presented through the Web site can be monitored and synchronized with the other information presented to the individual. The individual would also initialize this feature through the individual's preferences set by the individual with the system. Likewise, this same method can be implemented in conjunction with local cable providers or satellite television by communication with the converter box, determining the channel the box is tuned to, and then using this information, referencing a commercial programming schedule stored in the advertiser system 7. The information retrieved should be time stamped to know if the channel being watched is being watched when an advertisement is due to run. A URL or Web page can then be loaded to the user's account using the system outlined.

All identification information received from identification devices 3 can either be transmitted to the computer or server via the Internet at the end of the day or transmitted immediately via the intelligent wireless telephone 11 through the Internet as they are being received. Likewise, identification information received from a predetermined number of identification devices 3 can be stored and then bulk transferred to the computer of the advertising system 7 at predetermined times or levels.

When an interrogator 4 is used, a custom application program might be needed.

This application would reside on a platform which would collect and send the data from the interrogator 4, using commonly known protocols such as FTP, to the advertising system 7 where the time, location, and individual identification information would be used to transmit select information to a specified individual 1.

In an alternative embodiment, when a conventional fixed location business initiates use of the system, the merchant, rather than relying on a relational database of atlas information, may use an identification device 3 to "walk," plot and record the locations of interest to the merchant. As the merchant walks through an area, the locations the merchant's walked in define the perimeter of the area which the merchant has an interest in. Once the walk is complete, the system will associate the area within this perimeter with the merchant. This alternative embodiment allows the merchant to customize locations covered by the system to the merchant's choice. For ease of discussion, the identification device 3, when used by the Merchant to walk an area, may also be referred to as an information provider identification device.

The foregoing discussion has centered on conventional Internet based systems where telephone land lines are extensively used. However, those skilled in the art will recognize that alternative communications links can be used in the situation where an individual is in a remote location. In particular, communications systems which use it cellular phone/PCMCIA modem hybrid connections can overcome the lack of land telephone lines. This is useful in remote locales where identification devices 3 can be read, but not sent via conventional telephone land lines.

That alternative method of establishing the location of an individual 1 is to register their physical, street, or mailing address through an atlas database reference established coordinates that are triggered via GPS or other suitable scheme to then initiate data or advertisement delivery.

While the invention has been described with respect to a preferred embodiment thereof, it will be understood by those skilled in the art that various changes in detail may be made therein without departing from the spirit, scope, and teaching of the invention. For example, the device carried by the individual which communicates information may be any suitable technology, the type of device used by the individual to receive information from the advertising system may also vary. Accordingly, the invention herein disclosed is to be limited only as specified in the following claims.

I claim:

1. A time/location based information delivery system, comprising:
    a computer system, further comprising:
        means to communicate with a computer network;
        storage means for storing information related to individuals;
        means to communicate with information providers;
        input means to accept time/location information related to an individual, the times/location information having unique identifying information or an individual and information defining the location of the individual at a particular time;
        means to select user specific information from the information providers based on the location of the individual at a particular time; and
        means to communicate the user specific information to information output means;
    an identification device, further comprising:
        storage for storing unique identifying information;
        means to transfer the unique identifying information to an information retrieval device; and
    an information retrieval device, further comprising:
        means to wirelessly detect the presence of an identification device at a particular time and location;
        means to wirelessly retrieve the unique identifying information from the identification device;
        means to communicate the unique identifying information and the time and location of detection to the computer system;
    information output means, further comprising:
        means to receive the user specific information; and
        means to display specific information;
    whereby information is automatically selected and communicated to an output device based on the location of the identification device at a specific time.

2. A system, as in claim 1, wherein the unique identifying information includes identification information and demographic/preference information.

3. A system, as in claim 2, wherein the demographic/preference information includes information describing types of information the individual does or does not want to receive;
    whereby the individual can selectively filter received information.

4. A system, as in claim 1, wherein the identification device is an RFID device.

5. A system, as in claim 4, wherein the RFID device is embedded in a credit card.

6. A system, as in claim 4, further comprising means to remotely update the unique identifying information in the identification device.

7. A system, as in claim 4, wherein the RFID device is encased in a credit card sized container.

8. A system, as in claim 7, wherein the identification device further comprises;
    at least two RFID devices; and
    each RFID device operates on a different frequency or band.

9. A system, as in claim 4, wherein the identification device further comprises;
    at least two RFID devices; and
    each RFID device operates on a different frequency or band.

10. A system, as in claim 1, wherein the information related to individuals includes information provided by an individual regarding demographic and personal preferences.

11. A system, as in claim 10, wherein the selected user specific information is filtered by predetermined criteria.

12. A system, as in claim 11, wherein the predetermined criteria used to filter information from the information provider is based on the location of an individual, and/or the time that the individual is at that location.

13. A system, as in claim 12, wherein the information from the information provider is further filtered by the individual's personal preferences.

14. A system, as in claim 13, wherein the individual's personal preferences are entered by the individual.

15. A system, as in claim 13, wherein the individual's personal preferences are automatically determined based on the individual's choices, purchases and/or activities.

16. A system, as in claim 11, wherein the information from the information provider is further filtered by the individual's personal preferences.

17. A system, as in claim 16, wherein the individual's personal preferences are entered by the individual.

18. A system, as in claim 16, wherein the individual's personal preferences are automatically determined based on the individual's choices, purchases and/or activities.

19. A system, as in claim 10, wherein the information related to individuals is used to select information provided by information providers.

20. A system, as in claim 19, further comprising means to detect the activities of an individual, the detected activities of the individual further used as the information provided by the individual regarding demographic and personal preferences.

21. A system, as in claim 19, further comprising means to remotely update the unique identifying information in the identification device.

22. A system, as in claim 19, further comprising:
means to include advertisements from the information providers in the user specific information; and
means to dynamically select the advertisements based on the location of the individual and the time and/or location.

23. A system, as in claim 19, further comprising:
means to detect when an individual is in proximity to a visual or audio output device;
means to determine which program is being presented on the visual or audio output device; and
means to use information related to the program to select user specific information to be presented to the individual.

24. A system, as in claim 19, wherein the identification device is an RFID device.

25. A system, as in claim 24, wherein the identification device further comprises;
at least two RFID devices; and
each RFID device operates on a different frequency or band.

26. A system, as in claim 25, wherein the RFID device is embedded in a credit card.

27. A system, as in claim 25, wherein the RFID device is encased in a credit card sized container.

28. A system, as in claim 19, wherein the identification device is a wireless telephone.

29. A system, as in claim 28, further comprising:
means in the computer system to direct dial the wireless telephone;
means to output user specific information directly to the wireless telephone.

30. A system, as in claim 29, further comprising:
means to include advertisements from the information providers in the user specific information; and
means to dynamically select the advertisements based on the time and/or location of the individual.

31. A system, as in claim 29, further comprising means to detect the activities of an individual, the detected activities of the individual further used as the information provided by the individual regarding demographic and personal preferences.

32. A system, as in claim 19, wherein the identification device is a PDA.

33. A system, as in claim 32, further comprising:
means to include advertisements from the information providers in the user specific information; and
means to dynamically select the advertisements based on the time and/or location of the individual.

34. A system, as in claim 32, further comprising means to detect the activities of an individual, the detected activities of the individual further used as the information provided by the individual regarding demographic and personal preferences.

35. A system, as in claim 19, wherein the identification device is a computer.

36. A system, as in claim 35, further comprising:
means to include advertisements from the information providers in the user specific information; and
means to dynamically select the advertisements based on the tire and/or location of the individual.

37. A system, as in claim 35, further comprising means to detect the activities of an individual, the detected activities of the individual further used as the information provided by the individual regarding demographic and personal preferences.

38. A system, as in claim 1, wherein the identification device is a wireless telephone.

39. A system, as in claim 38, further comprising:
means in the computer system to direct dial the wireless telephone;
means to output user specific information directly to the wireless telephone.

40. A system, as in claim 1 wherein the identification device is a PDA.

41. A system, as in claim 1, wherein the identification device is a computer.

42. A system, as in claim 1, wherein the information output device further comprises:
means to detect an identification device; and
means to initiate contact with the computer system, and download and display user specific information related to the identification device;
whereby an individual can access information related to that individual by using the identification device to identify the individual to the computer system.

43. A system, as in claim 1, wherein the selected user specific information is filtered by predetermined criteria.

44. A system, as in claim 43, wherein the predetermined criteria used to filter information from the information provider is based on the location of an individual, and/or the time that the individual is at that location.

45. A system, as in claim 44, wherein the information from the information provider is further filtered by the individual's personal preferences.

46. A system, as in claim 45, wherein the individual's personal preferences are entered by the individual.

47. A system, as in claim 45, wherein the individual's personal preferences are automatically determined based on the individual's choices, purchases and/or activities.

48. A system, as in claim 1, wherein the information from the information provider is further filtered by the individual's personal preferences.

49. A system, as in claim 48, wherein the individual's personal preferences are entered by the individual.

50. A system, as in claim 48, wherein the individual's personal preferences are automatically determined based on the individual's choices, purchases and/or activities.

51. A system, as in claim 1, wherein the identification device can be an RF device, a smart card, a near field tag, a bar code, a magnetic strip, an ultrasonic transducer or an infrared device.

52. A system, as in claim 1, further comprising:
a buddy list identifying related individuals for at least a first individual;
means to detect when related individuals on the buddy list are in a predetermined location or area; and
means to notify the first individual and each detected related individual of the presence of each other in the predetermined location.

53. A system, as in claim 1, further comprising means to detect the activities of an individual, the detected activities of the individual further used as the information provided by the individual regarding demographic and personal preferences.

54. A system, as in claim 1, further comprising:

means to include advertisements from the information providers in the user specific information; and means to dynamically select the advertisements based on the location of the individual and the time and/or location.

55. A system, as in claim 1, further comprising:

means to detect when an individual is in proximity to a visual or audio output device;

means to determine which program is being presented on the visual or audio output device; and means to use information related to the program to select user specific information to be presented to the individual.

56. A system, as in claim 1, further comprising:

an information provider identification device, the information provider identification device having information identifying a particular information provider;

means to detect the movement information provider identification device as it moves through specific geographic locations, the movement of the information provider identification device defining a geographic area for which information from the information provider will be distributed;

means to distribute information provided by information providers only if an identification device is in a specific geographic area defined by the information provider identification device after the information provider has walked the area;

whereby an information provider can selectively determine the locations where information provider information can be distributed.

57. A time and location based information delivery system, comprising:

a computer system, further comprising:
   means to communicate with a computer network;
   storage means for storing information related to individuals;
   means to communicate with information providers;
   input means to accept time/location information related to an individual, the times/location information having unique identifying information or an individual and information defining the location of the individual at a particular time;
   means to select user specific information from the information providers based on the location of the individual at a particular time; and
   means to communicate the user specific information to information output means;

an identification device, further comprising:
   storage for storing unique identifying information;
   means to wirelessly transfer the unique identifying information to an information retrieval device; and an information retrieval device, further comprising:
   means to wirelessly detect the presence of an identification device at a particular time;
   means to receive position information from GPS satellites;
   means to wirelessly retrieve the unique identifying information from the identification device;
   means to communicate the unique identifying information, the time information, and the GPS satellite position information to the computer system;

information output means, further comprising:
   means to receive the user specific information; and
   means to display specific information;

whereby information is automatically selected and communicated to an output device based on the location of the identification device at a specific time.

58. A system, as in claim 57, wherein the identification device is a wireless telephone.

59. A system, as in claim 58, further comprising:

display means in the wireless telephone;

means to receive the user specific information; and means to display the user specific information on the display means in the wireless telephone.

60. A system, as in claim 39, further comprising:

means in the computer system to direct dial the wireless telephone;

means to output user specific information directly to the wireless telephone.

61. A system, as in claim 57, further comprising:

an information provider identification device, the information provider identification device having information identifying a particular information provider;

means to detect the movement of the information provider identification device as it moves through specific geographic locations, the movement of the information provider identification device defining the perimeter of a geographic area for which information from the information provider will be distributed;

means to distribute information provided by information providers only if an identification device is in a specific geographic area defined by the information provider identification device after the information provider has walked the area;

whereby an information provider can selectively determine a geographic area where information provider information can be distributed.

62. A system, as in claim 57, wherein the information output device further comprises:

means to detect an identification device; and means to initiate contact with the computer system, and download and display user specific information related to the identification device;

whereby an individual can access information related to that individual by using the identification device to identify the individual to the computer system.

63. A system, as in claim 57, further comprising:

a buddy list identifying related individuals for at least a first individual;

means to detect when related individuals on the buddy list are in a predetermined location or area; and means to notify the first individual and each detected related individual of the presence of each other in the predetermined location.

64. A system, as in claim 57, further comprising:

means to include advertisements from the information providers in the user specific information; and means to dynamically select the advertisements based on the time and/or location of the individual.

65. A system, as in claim 57, further comprising means to detect the activities of an individual, the detected activities of the individual further used as the information provided by the individual regarding demographic and personal preferences.

66. A system, as in claim 57, further comprising:
means to detect when an individual is in proximity to a visual or audio output device;
means to determine which program is being presented on the visual or audio output device; and
means to use information related to the program to select user specific information to be presented to the individual.

67. A method of delivering focused information based on time and location, including the steps of:
storing information related to individuals;
acquiring information from information providers;
using an identification device to store unique identifying information related to an individual;
using an information device to wirelessly detect an identification device when the identification device is within a predetermined geographic area;
wirelessly transferring the unique identifying information to the information retrieval device;
transferring time/location information related to the time and location of the information retrieval device when the information retrieval device is detected; and
selecting user specific information from information providers based on the unique identifying information and the time and location information and transmitting that information to an output device associated with the identification device;
whereby information is automatically selected and communicated to an output device based on the location of the identification device at a specific time;
moving an information provider identification device which has information identifying a particular information provider through a geographic area;
detecting the information provider device as it moves through the geographic area;
defining the geographic area for which information from the information provider will be distributed based on the movement of the information provider identification device as it moves through the geographic area; and
distributing information provided by information service providers only if an identification device is in a specific geographic arc defined by the information provider identification device;
whereby an information provider can selectively determine the location where the information provider information can be distributed.

68. A method, as in claim 67, including the additional step of using an RFID device as the identification device.

69. A method, as in claim 67, including the additional step of embedding the RFID device in a credit card.

70. A method, as in claim 68, including the additional step of remotely updating the unique identifying information in the identification device.

71. A method, as in claim 68, including the additional step of encasing the RFID device in a credit card shaped container.

72. A method, as in claim 68, including the additional steps of:
using at least two RFID devices; and
operating different frequency or bands in each RFID device.

73. A method, as in claim 67, including the additional step of using a wireless telephone as the identification device.

74. A method, as in claim 73, including the additional steps to:
using the output device to detect an identification device;
initiating contact with the computer system from the output device when the identification device is detected; and
downloading and displaying user specific information related to the identification device;
whereby an individual can access information related to that individual by using the identification device to identify the individual to the computer system.

75. A method, as in claim 67, including the additional step of using a PDA as the identification device.

76. A method, as in claim 67, including the additional step of using a computer as the identification device.

77. A method, as in claim 67, including the additional steps of:
using the output device to detect an identification device;
initiating contact with the computer system from the output device when the identification device is detected; and
downloading and displaying user specific information related to the identification device;
whereby an individual can access information related to that individual by using the identification device to identify the individual to the computer system.

78. A method, as in claim 67, including the additional step of using predetermined criteria to filter the selected user specific information.

79. A method, as in claim 78, including the additional step of using the location of an individual, and/or the time that the individual is at that location as the predetermined criteria used to filter information from the information provider.

80. A method, as in claim 79, including the additional step of using the individual's personal preferences to fixer filter the information from the information provider.

81. A method, as in claim 80, wherein the individual enters the individual's personal preferences.

82. A method, as in claim 80, including the additional step of automatically determining the individual's personal preferences based on the individual's choices, purchases and/or activities.

83. A method, as in claim 67, including the additional step of using the individual's personal preferences to filter the information from the information provider.

84. A method, as in claim 83, wherein the individual enters the individual's personal preferences.

85. A method, as in claim 83, including the additional step of automatically determining the individual's personal preferences based on the individual's choices, purchases and/or activities.

86. A method, as in claim 67, including the additional step of using an RF device, a smart card, a near field tag, a bar code, a magnetic strip, an ultrasonic transducer or an infrared device as the identification.

87. A method, as in claim 67, including the additional steps of:
creating a buddy list identifying related individuals for at least a first individual;
detecting when related individuals on the buddy list are in a predetermined location or area; and
notifying the first individual and each detected related individual of the presence of each other in the predetermined location.

88. A method, as in claim 67, including the additional steps of:
including advertisements from the information providers in the user specific information; and
dynamically selecting the advertisements based on the time and/or location of the individual.

89. A method, as in claim 67, including the additional steps of:
detecting when an individual is in proximity to a visual or audio output device;
determining which program is being presented on the visual or audio output device; and
using information related to the program to select user specific information to be presented to the individual.

90. A method of delivering time and location based information to an individual, including the steps of:
storing information related to individuals;
detecting presence of an identifying device, the identifying device having unique identifying information;
obtaining information from information providers;
using GPS position information data to determine the location of the identifying device;
determining time/location information related to an individual, the times/location information having unique identifying information or an individual and information defining the location of the individual at a particular time;
selecting user specific information from the information providers based on the location of the individual at a particular time, and based on the unique identifying information; and
outputting the user specific information to an output device;
whereby information is automatically selected and communicated to an output device based on the location of the identification device at a specific time;
moving an information provider identification device which has information identifying a particular information provider through a geographic area;
detecting the information provider device as it moves through the geographic area;
defining the geographic area for which information from the information provider will be distributed based on the movement of the information provider identification device as it moves through the geographic area; and
distributing information provided by information service providers only if an identification device is in a specific geographic are defined by the information provider identification device;
whereby an information provider can selectively determine the location where the information provider information can be distributed.

91. A method, as in claim 90, including the additional step of using a wireless telephone as the identification device.

92. A method, as in claim 91, including the additional step of using a display in the wireless telephone as the output device.

93. A method, as in claim 90, including the additional step of using a PDA as the identification device.

94. A method, as in claim 90, including the additional step of using a computer as the identification device.

95. A method, as in claim 90, including the additional steps of:
including advertisements from the information providers in the user specific information; and
dynamically selecting advertisements based on the time and/or location of the individual.

* * * * *